US012375919B2

(12) United States Patent
Fujishiro

(10) Patent No.: US 12,375,919 B2
(45) Date of Patent: Jul. 29, 2025

(54) COMMUNICATION CONTROL METHOD FOR COMMUNICATING WITH PUBLIC AND NON-PUBLIC CELLULAR NETWORKS

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 335 days.

(21) Appl. No.: 17/456,619

(22) Filed: Nov. 26, 2021

(65) Prior Publication Data
US 2022/0109991 A1 Apr. 7, 2022

Related U.S. Application Data

(63) Continuation of application No. PCT/JP2020/020015, filed on May 20, 2020.

(30) Foreign Application Priority Data

May 29, 2019 (JP) .................. 2019-100378

(51) Int. Cl.
*H04W 12/086* (2021.01)
*H04W 8/18* (2009.01)
*H04W 12/02* (2009.01)
*H04W 48/16* (2009.01)
*H04W 84/04* (2009.01)

(52) U.S. Cl.
CPC ......... *H04W 12/086* (2021.01); *H04W 8/183* (2013.01); *H04W 12/02* (2013.01); *H04W 48/16* (2013.01); *H04W 84/045* (2013.01)

(58) Field of Classification Search
CPC ... H04W 12/086; H04W 8/183; H04W 12/02; H04W 48/16; H04W 84/045
See application file for complete search history.

(56) References Cited

U.S. PATENT DOCUMENTS 8,335,188 B1 * 12/2012 Harris ................ H04W 12/03
455/434
9,226,211 B2 12/2015 Yeh et al.
9,282,571 B2 3/2016 Khoryaev et al.
(Continued)

FOREIGN PATENT DOCUMENTS

EP 3811683 A1 4/2021
EP 3886506 A1 9/2021
(Continued)

OTHER PUBLICATIONS

3rd Generation Partnership Project; Technical Specification Group Services and System Aspects; Study on enhancement of 5G System (5GS) for vertical and Local Area Network (LAN) services; 3GPP TR 23.734, V16.1.0, Mar. 2019; pp. 1-111; Valbonne—France.
(Continued)

*Primary Examiner* — Viet D Vu
(74) *Attorney, Agent, or Firm* — Studebaker Brackett PLLC

(57) ABSTRACT

A network identifier for identifying a non-public cellular network allowed to be accessed from a user equipment and frequency information indicating a frequency of the non-public cellular network are stored in a SIM. The user equipment performs search processing for the non-public cellular network in accordance with the network identifier and the frequency information stored in the SIM.

5 Claims, 10 Drawing Sheets

(56) References Cited

U.S. PATENT DOCUMENTS

| | | | |
|---|---|---|---|
| 9,313,802 B2 | 4/2016 | Heo et al. | |
| 9,313,803 B2 | 4/2016 | Stojanovski et al. | |
| 9,357,463 B2 | 5/2016 | Bangolae et al. | |
| 9,503,892 B2 | 11/2016 | Bashar et al. | |
| 9,525,538 B2 | 12/2016 | Sirotkin | |
| 9,526,001 B2 | 12/2016 | Stojanovski et al. | |
| 9,532,213 B2 | 12/2016 | Luft et al. | |
| 9,686,677 B2 | 6/2017 | Pinheiro et al. | |
| 9,788,201 B2 | 10/2017 | Stojanovski et al. | |
| 9,801,054 B2 | 10/2017 | Oyman | |
| 9,848,322 B2 | 12/2017 | Zhang et al. | |
| 9,860,912 B2 | 1/2018 | Khoryaev et al. | |
| 9,942,914 B2 | 4/2018 | Heo et al. | |
| 10,051,653 B2 | 8/2018 | Bangolae et al. | |
| 10,129,903 B2 | 11/2018 | Khoryaev et al. | |
| 10,257,849 B2 | 4/2019 | Zhang et al. | |
| 10,292,180 B2 | 5/2019 | Sirotkin | |
| 10,433,327 B2 | 10/2019 | Oyman | |
| 10,448,419 B2 | 10/2019 | Stojanovski et al. | |
| 10,492,214 B2 | 11/2019 | Heo et al. | |
| 10,582,528 B2 | 3/2020 | Khoryaev et al. | |
| 10,868,648 B2 | 12/2020 | Zhang et al. | |
| 10,972,235 B2 | 4/2021 | Stojanovski et al. | |
| 11,089,569 B2 | 8/2021 | Hapsari et al. | |
| 11,139,932 B2 | 10/2021 | Khoryaev et al. | |
| 2005/0153692 A1 | 7/2005 | Hwang et al. | |
| 2008/0076398 A1* | 3/2008 | Mate | C22C 21/00 455/414.2 |
| 2010/0279684 A1* | 11/2010 | Salkintzis | H04W 48/20 455/434 |
| 2013/0007039 A1 | 1/2013 | Edara | |
| 2015/0004969 A1 | 1/2015 | Han et al. | |
| 2015/0074540 A1* | 3/2015 | Moritomo | H04L 41/22 715/739 |
| 2015/0327247 A1 | 11/2015 | Chen et al. | |
| 2016/0037338 A1* | 2/2016 | Venkiteswaran | H04L 63/0853 726/4 |
| 2018/0049244 A1 | 2/2018 | Lee | |
| 2019/0191470 A1* | 6/2019 | Joseph | H04W 48/02 |

FOREIGN PATENT DOCUMENTS

| | | |
|---|---|---|
| JP | 2005-184824 A | 7/2005 |
| JP | 2012-049787 A | 3/2012 |
| JP | 2016-506659 A | 3/2016 |
| WO | 2018/074552 A1 | 4/2018 |

OTHER PUBLICATIONS

SA2, "LS on RAN Impact Analysis due to TSN", 3GPP TSG RAN Meeting #82; RP-182698; Dec. 10-13, 2018, pp. 1-27, Sorrento, Italy.

Tencent, SA2, "Support of Standalone Non-Public Nwtworks", SA WG2 Meeting #133; S2-1905395; May 13-17, 2019, pp. 1-4, Reno, USA.

Qualcomm Incorporated, Ericsson, Nokia, Nokia Shanghai Bell; "Updating Solution 1"; SA WG2 Meeting #128bis; S2-188912; Aug. 20-24, 2018; total 6 pages; Sophia Antipolis, France.

Nokia, Nokia Shanghai Bell, "NRG (Solution #10) Evaluation", SA WG2 Meeting #129, S2-1810440, Oct. 15-19, 2018, Dongguan, China, total 7 pages.

Qualcomm Incorporated; "RAN2 impacts of Non-public Networks (NPN) work in SA2"; 3GPP TSG-RAN WG2 Meeting #105; R2-1901805; Feb. 25-Mar. 1, 2019; total 3 pages; Athens, Greece.

Ericsson; "Commonalities in solutions for Non-Public Network deployments"; 3GPP TSG-RAN WG2 #105-Bis; R2-1903497; Apr. 8-12, 2019; total 10 pages; Xi'an, China.

Ericsson; "Submission for information on Commonalities in solutions for Non-Public Network deployments"; 3GPP TSG-RAN WG2 #106; R2-1907313, May 13-17, 2019; total 9 pages; Reno, Nevada, USA.

Intel Corporation ; "RAN2 Impact on Non-Public Network Deployment using SNPN"; 3GPP TSG RAN WG2 Meeting #105; R2-1900760; Feb. 25-Mar. 1, 2019; total 6 pages; Athens, Greece.

ZTE Corporation; "Cell reselection priority in inaction state"; 3GPP TSG-RAN WG2 Meeting #102; R2-1807315; May 21-25, 2018; total 5 pages; Busan, Korea.

MediaTek Inc.; "Misc. corrections to NPN", 3GPP TSG-SA2 Meeting #133, S2-1905211, May 13-17, 2019, total 9 pages, Reno, NV, USA.

Qualcomm Incorporated, Ericsson, Nokia, Nokia Shanghai Bell, NICT, Intel; "TS 23.501: Introducing Non-public network", 3GPP TSG-SA2 Meeting #131, S2-1902812, Feb. 25-Mar. 1, 2019, total 12 pages, Santa Cruz—Tenerife, Spain.

Qualcomm Incorporated, NICT; "TS 23.501: Introducing Non-public network", 3GPP TSG-SA2 Meeting #130, S2-1901109, Jan. 21-25, 2019, total 11 pages, Kochi, India.

3rd Generation Partnership Project; Technical Specification Group Radio Access Network; NR; User Equipment (UE) Procedures in Idle mode and RRC Inactive state (Release 15); 3GPP TS 38.304, V15.3.0, Mar. 2019; pp. 1-29; Valbonne—France.

* cited by examiner

STANDALONE NPN

NON-STANDALONE NPN

NPN INFORMATION STORED IN SIM

| NPN-ID (CAG ID) | FREQUENCY INFORMATION | PRIORITY |
|---|---|---|
| ID#1 | FREQUENCY #1 | 1 |
| ID#2 | FREQUENCY #2 | 2 |

FIG. 7

COMMUNICATION CONTROL METHOD FOR COMMUNICATING WITH PUBLIC AND NON-PUBLIC CELLULAR NETWORKS

RELATED APPLICATIONS

The present application is a continuation based on PCT Application No. PCT/JP2020/020015, filed on May 20, 2020, which claims the benefit of Japanese Patent Application No. 2019-100378 filed on May 29, 2019. The content of which is incorporated by reference herein in their entirety.

TECHNICAL FIELD

The present disclosure relates to a communication control method used in a cellular communication system.

BACKGROUND ART

NPL 1 describes a technology of configuring a small-scale non-public cellular network (non-public network (NPN)) available for specific subscribers in the fifth generation (5G) cellular communication system. Such a non-public cellular network is also referred to as a private network, and for example, a use case of being used for private radio communication in a factory is assumed.

CITATION LIST

Non Patent Literature

NPL 1: 3GPP Technical Report TR 23.734 V16.1.0, "Study on enhancement of 5G System (5GS) for vertical and Local Area Network (LAN) services", March 2019

SUMMARY

A communication control method according to a first aspect is a method using a user equipment including a subscriber identification module (SIM). A network identifier for identifying a non-public cellular network allowed to be accessed from the user equipment and frequency information indicating a frequency of the non-public cellular network are stored in the SIM. The user equipment performs search processing for the non-public cellular network, based on the network identifier and the frequency information stored in the SIM.

In a communication control method according to a second aspect, a base station managing a cell belonging to a public cellular network broadcasts information related to a non-public cellular network associated with the cell, to a user equipment in the cell, and the user equipment receives the information broadcast from the base station, and performs search processing for the non-public cellular network, based on the received information. The information broadcast from the base station includes at least one of a network identifier for identifying the non-public cellular network, frequency information indicating a frequency of the non-public cellular network, or a cell identifier of a cell belonging to the non-public cellular network.

A communication control method according to a third aspect is a method executed by a user equipment in an RRC idle state or an RRC inactive state. In the communication control method, when cell selection or cell reselection is performed, cell search and ranking based on a measurement result of a cell detected through the cell search are performed, and when at least one first cell belonging to a non-public cellular network given permission to access from the user equipment and at least one second cell other than the at least one first cell are detected through the cell search, the at least one second cell is excluded from the ranking, and the ranking is performed on the at least one first cell.

BRIEF DESCRIPTION OF DRAWINGS

FIG. 7 is a diagram illustrating NPN information stored in a SIM according to an embodiment.

DESCRIPTION OF EMBODIMENTS

Figure 1:
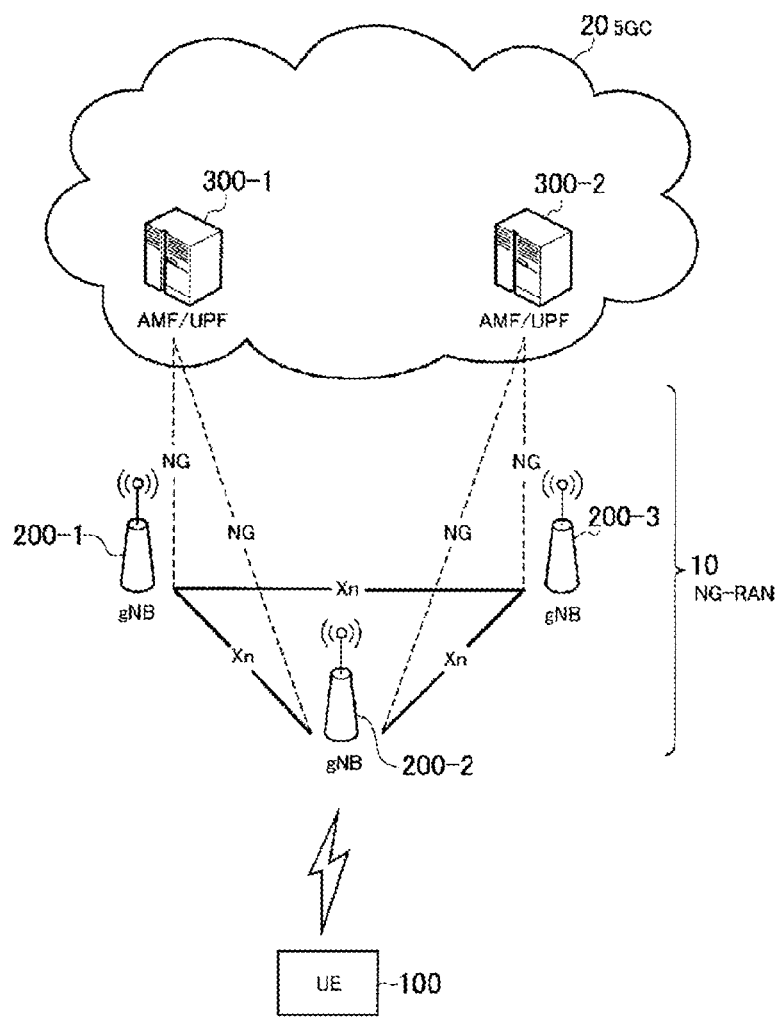
FIG. 1 is a diagram illustrating a configuration of a cellular communication system according to an embodiment.

A technology in which a user equipment efficiently detects, selects, and accesses a non-public cellular network has not yet been established. In order to enable a user equipment to smoothly use a non-public cellular network, implementation of such a technology is desired.

In the light of this, the present disclosure enables a user equipment to smoothly use a non-public cellular network.

A cellular communication system according to an embodiment will be described with reference to the drawings. In the description of the drawings, the same or similar parts are given the same or similar reference numerals.

Cellular Communication System First, a configuration of a cellular communication system according to an embodiment will be described. Although the cellular communication system according to an embodiment is a 5G system of 3GPP, LTE may be at least partially applied to the cellular communication system.

FIG. 1 is a diagram illustrating a configuration of the cellular communication system according to an embodiment.

As illustrated in FIG. 1, the cellular communication system includes a user equipment (UE) 100, a 5G radio access network (next generation radio access network (NG-RAN)) 10, and a 5G core network (5GC) 20.

The UE 100 is a mobile apparatus. The UE 100 may be any apparatus as long as the UE is used by a user. Examples of the UE 100 include, for example, a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
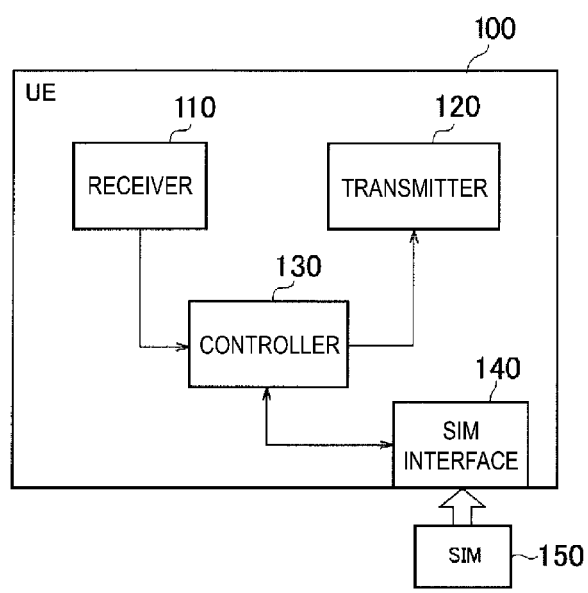
FIG. 2 is a diagram illustrating a configuration of a user equipment (UE) according to an embodiment.

FIG. 2 is a diagram illustrating a configuration of the UE 100 (user equipment).

As illustrated in FIG. 2, the UE 100 includes a receiver 110, a transmitter 120, a controller 130, and a subscriber identification module (SIM) interface 140.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various kinds of processes.

A SIM 150 is connected to the SIM interface 140. The SIM 150 may be referred to as a user identity module (UIM) or a universal integrated circuit card (UICC).

In the SIM 150, information for identifying a subscriber, carrier identification information for identifying a communication carrier, information related to available services that a subscriber has a contract with, and the like are stored.

Further, in the SIM 150, information necessary for receiving services is stored. Examples of such information include information in a case of registering position information and information related to a telephone number.

The SIM interface 140 may allow accommodation and/or removal of the SIM 150. Alternatively, the SIM 150 may be an embedded SIM (eSIM). When reading and writing of information is requested from the controller 130, the SIM interface 140 reads information stored in the SIM 150 and writes information to the SIM 150.

Figure 3:
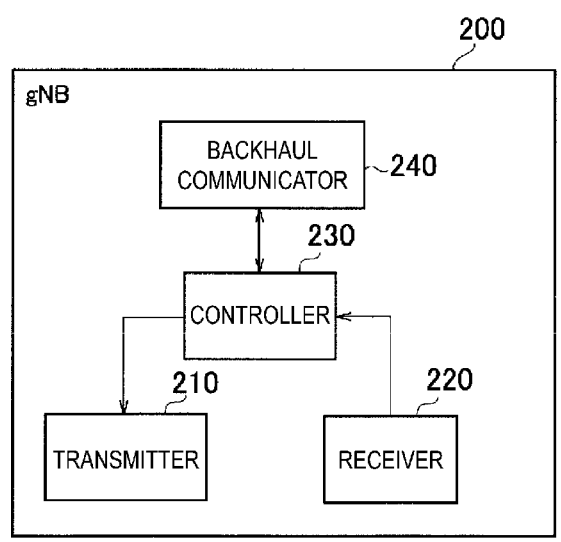
FIG. 3 is a diagram illustrating a configuration of a base station (gNB) according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
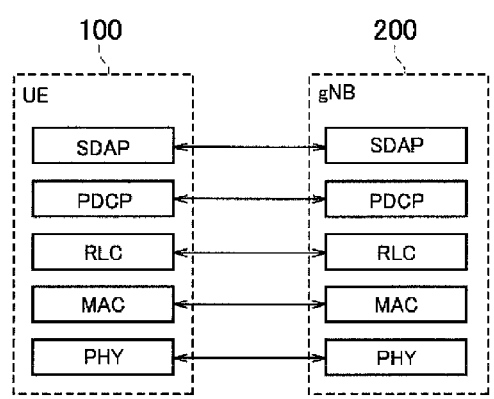
FIG. 4 is a diagram illustrating a configuration of a protocol stack of a radio interface of a user plane according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow as the unit of QoS control by the core network and a radio bearer as the unit of QoS control by an access stratum (AS). Note that, when the RAN is connected to the EPC, the SDAP may not be provided.

Figure 5:
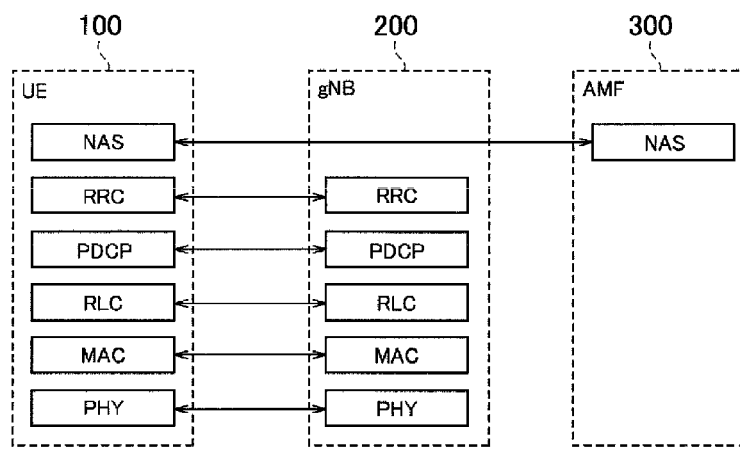
FIG. 5 is a diagram illustrating a configuration of a protocol stack of a radio interface of a control plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Non-Public Cellular Network

Next, the non-public cellular network (non-public network (NPN)) according to an embodiment will be described. The NPN is, in a 5G cellular communication system, a small-scale cellular network that can be used by a specific subscriber. The NPN is, for example, used for the purpose of private radio communication in a factory. The NPN may be referred to as a private network.

Figure 6:
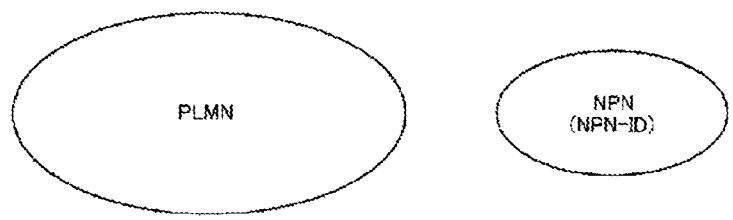
FIG. 6 is a diagram illustrating an example of NPNs according to an embodiment.
Figure 6:
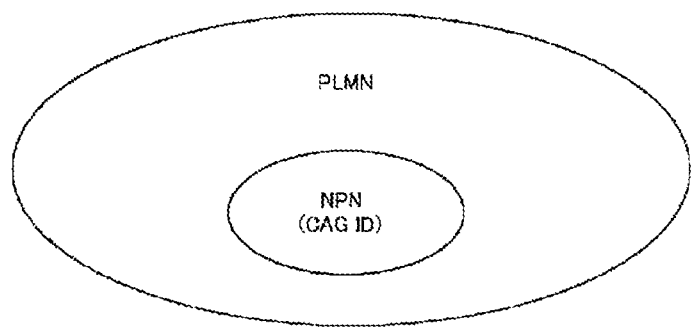

FIG. 6 is a diagram illustrating an example of NPNs according to an embodiment.

As illustrated in FIG. 6, the NPN includes two types, namely a standalone NPN and a non-standalone NPN.

The standalone NPN is independent of a public land mobile network (PLMN) being a public cellular network and is not dependent on a network function of the PLMN.

In contrast, the non-standalone NPN is configured as a part of the PLMN and is capable of service continuation with the PLMN. In the description below, in order to distinguish from the NPN, the PLMN other than the NPN is referred to as a "public PLMN" as appropriate.

Note that each of the public PLMN and the NPN may have an NG-RAN 10 and a 5GC 20. Further, it is assumed that one or a plurality of frequencies (frequency bands and/or carrier frequencies) are allocated to one NPN. Further, one frequency may be allocated to a plurality of geographically separated NPNs. By separating the geographical areas of the NPNs using one frequency, the same frequency can be shared by the plurality of NPNs.

In a case of the standalone NPN, an NPN-ID is allocated to the NPN as a network identifier for identifying the NPN. The cell (gNB 200) belonging to the NPN broadcasts the NPN-ID of the NPN to which the cell belongs (or the NPN for which the cell provides service, or the NPN for which the cell gives permission to access). Further, a special PLMN ID for identifying the NPN is allocated to the NPN, and the cell (gNB 200) belonging to the NPN may broadcast the special PLMN ID.

In a case of the non-standalone NPN, a closed access group (CAG) ID is allocated to the NPN as a network identifier for identifying the NPN. The cell (gNB 200) belonging to the NPN broadcasts a CAG ID of the NPN to which the cell belongs (or the NPN for which the cell provides service, or the NPN for which the cell gives permission to access). Note that the CAG ID is also an identifier of a group including a part of specific users that can access the NPN out of subscriber users of the PLMN. Note that the NPN-ID may be allocated to the NPN instead of the CAG ID, and both of the NPN-ID and the CAG ID may be allocated to the NPN.

NPN Information Stored in SIM

Next, NPN information stored in the SIM 150 will be described. In an embodiment, in the SIM 150, information related to the NPN is stored. The information related to the NPN is stored in the SIM 150 in advance at the time point when the SIM 150 is provided.

FIG. 7 is a diagram illustrating the NPN information stored in the SIM 150 according to an embodiment.

As illustrated in FIG. 7, the network identifier (NPN-ID or CAG ID) for identifying the NPN given permission to access from the UE 100, and frequency information indicating a frequency (frequency band, carrier frequency) of the NPN are stored in the SIM 150. The NPN given permission to access from the UE 100 refers to the NPN to which the UE 100 subscribes, and the NPN that the UE 100 has the authority to access.

The UE 100 performs search processing, specifically cell search, for the NPN, based on the network identifier and the frequency information stored in the SIM. For example, the UE 100 searches for a cell that belongs to the frequency indicated by the frequency information stored in the SIM, and that broadcasts the network identifier the same as the network identifier stored in the SIM. In this manner, the UE 100 can efficiently detect the cell belonging to the NPN given permission to access.

In the SIM 150, a plurality of sets of the network identifier and the frequency information may be stored. In this case, an access priority may be configured for each network identifier. FIG. 7 illustrates an example in which two sets of the network identifier and the frequency information are stored in the SIM 150. Further, priority "1" is configured for the network identifier "ID #1", and priority "2" is configured for the network identifier "ID #2". Note that the priority need not be stored in the SIM 150 as explicit information. For example, the priority may be configured according to the order in which the network identifiers are arranged. The UE 100 selects any one set out of the plurality of sets (plurality of network identifiers), based on the configured access priority.

In the SIM 150, effective area information may be stored being associated with the frequency information. The effective area information may be information indicating a geographical position at which NPN service is permitted in a corresponding frequency. For example, the effective area information may be latitude and longitude and/or altitude, or may be a cell ID of a public PLMN base station, a RAN area ID, and/or a tracking area ID. One or a plurality of pieces of effective area information are associated with one NPN ID or piece of frequency information. The UE 100 may identify the network identifier of the NPN and the frequency information effective regarding the position of the UE 100, based on the effective area information, and use the identified information for search processing.

Figure 8:
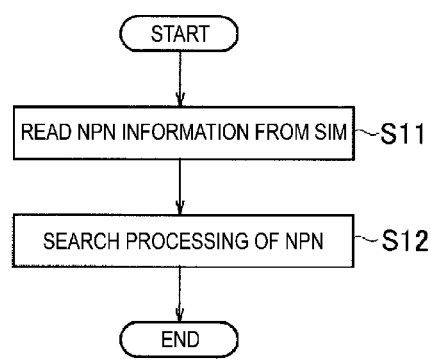
FIG. 8 is a diagram illustrating an operation example of the UE related to the SIM according to an embodiment.

FIG. 8 is a diagram illustrating an operation example of the UE 100 related to the SIM 150 according to an embodiment.

As illustrated in FIG. 8, in Step S11, an upper layer entity of the UE 100 reads the NPN information from the SIM 150. The upper layer entity refers to an entity of an upper layer of the RRC layer of the UE 100. The upper layer entity notifies an AS entity of the UE 100 of the read NPN information. The AS entity refers to an entity of the RRC layer or lower layers of the UE 100.

When a plurality of sets of the network identifier and the frequency information are stored in the SIM 150, the upper layer entity may select any one set out of the plurality of sets (plurality of network identifiers), based on the configured access priority, and notify the AS entity of the selected set.

When the AS entity of the UE 100 is notified of the NPN information (for example, a set of the network identifier and the frequency information) from the upper layer entity of the UE 100, the AS entity may determine that access to the cell of the NPN indicated by the network identifier is permitted.

In Step S12, the AS entity of the UE 100 performs search processing for the NPN, based on the NPN information notified from the upper layer entity of the UE 100.

Specifically, in operation of the cell selection, when the AS entity is provided with the frequency information from the upper layer entity, the AS entity performs search preferentially for the frequency indicated by the frequency information and detects the NPN ID (or CAG ID). The AS entity may notify the upper layer entity of the detected NPN ID (or CAG ID). If the AS entity has been provided with information of the NPN ID (or CAG ID) from the upper layer entity in advance, the AS entity may notify the upper layer entity of only an ID that matches the information that has been provided from the upper layer entity out of the detected NPN IDs (or CAG IDs). Based on the information notified from the AS entity, the upper layer entity can know an accessible network. Alternatively, final determination as to whether the upper layer entity can access or not may be performed.

Further, when the UE 100 performs cell reselection in the RRC idle state or the RRC inactive state, the AS entity of the UE 100 raises priority of the frequency (NPN frequency) indicated by the frequency information, based on the frequency information included in the NPN information notified from the upper layer entity. For example, the UE 100 may select an NPN cell through the operation of cell selection described above, and then raise priority of the frequency to which the currently selected NPN (NPN to which the currently selected cell belongs, currently camped NPN) belongs. The AS entity may configure the priority of the frequency (NPN frequency) indicated by the frequency information to the highest priority.

Note that cell selection or cell reselection refers to selection or reselection of a cell to be used as a serving cell of the UE 100.

As a result, in cell reselection, even when the frequency of the current serving cell and the frequency of the NPN given permission to access are different from each other, the AS entity of the UE 100 can measure radio quality of the frequency of the NPN given permission to access, and reselect a neighboring cell belonging to the frequency of the NPN as the serving cell of the UE 100.

NPN Information Broadcast from gNB of Public PLMN

Next, NPN information broadcast from the gNB 200 of the public PLMN will be described. In an embodiment, the gNB 200 of the public PLMN broadcasts a system information block (SIB) including the NPN information.

Specifically, the gNB 200 that manages a cell belonging to the public PLMN broadcasts the NPN information related to the NPN associated with the cell to UEs 100 in the cell. The information broadcast from the gNB 200 includes at least one of the network identifier for identifying the NPN, the frequency information indicating the frequency (frequency band, carrier frequency) of the NPN, or the cell identifier of the cell belonging to the NPN. The cell identifier may be a base station ID (gNB ID). The frequency information may include information indicating an initial bandwidth part (BWP) to be used for the first access. The BWP refers to a band part of a part of a frequency of a cell. The information broadcast from the gNB 200 may include a beam ID or may include SSB information (a synchronization signal/broadcast channel block including a synchronization signal and a physical broadcast channel).

For example, in a case of the standalone NPN, the gNB 200 that manages a cell belonging to the public PLMN broadcasts the NPN information related to the NPN geographically close to the cell. In a case of the non-standalone NPN, the gNB 200 that manages a cell belonging to the public PLMN broadcasts the NPN information related to the NPN belonging to the PLMN the same as that of the gNB 200.

The UE 100 receives the NPN information broadcast from the gNB 200 of the public PLMN, and performs search processing for the NPN, based on the received NPN information. For example, the UE 100 belongs to the frequency indicated by the frequency information included in the received NPN information, and searches for a cell to broadcast the network identifier the same as the network identifier included in the received NPN information. The UE 100 located in the cell of the gNB 200 of the public PLMN may exclude the NPN to which the NPN information is not broadcast from the gNB 200, from the target of the search processing.

Figure 9:
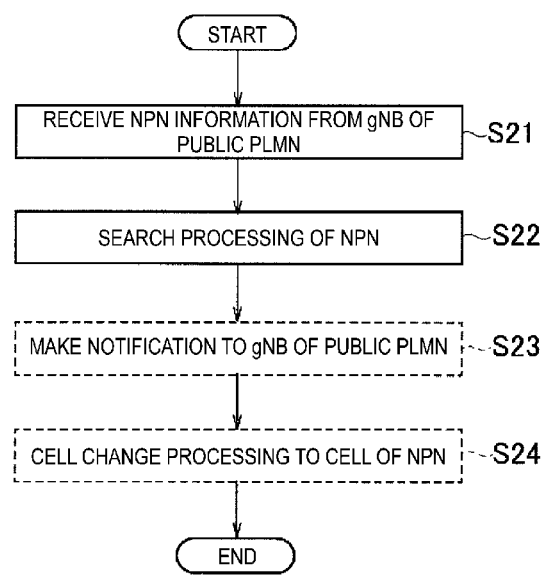
FIG. 9 is a diagram illustrating an operation example of the UE related to broadcast information according to an embodiment.

FIG. 9 is a diagram illustrating an operation example of the UE 100 related to broadcast information according to an embodiment.

As illustrated in FIG. 9, in Step S21, the gNB 200 that manages a cell belonging to the public PLMN broadcasts the SIB including the NPN information related to the NPN associated with the cell to the UEs 100 in the cell. The UE 100 receives the NPN information from the gNB 200.

In Step S22, the UE 100 performs search processing for the NPN corresponding to the NPN information, based on the NPN information received from the gNB 200. For example, the UE 100 belongs to the frequency indicated by the frequency information included in the received NPN information, and searches for a cell to broadcast the network identifier the same as the network identifier included in the received NPN information. The UE 100 may exclude the NPN to which the NPN information is not broadcast from the gNB 200, from the target of the search processing.

Here, it may be assumed that the UE 100 performs the search processing only for the NPN in which the network identifier is stored in the SIM 150, specifically, the NPN given permission to access from the UE 100. Specifically, only when the network identifier broadcast from the gNB 200 of the public PLMN and the network identifier stored in the SIM 150 match, the search processing for the NPN indicated by the network identifier may be performed.

The following description is provided based on the assumption that the UE 100 has detected, through the search processing, a cell belonging to the NPN of a search target.

When the UE 100 is in the RRC connected state, in Step S23, the UE 100 transmits, to the gNB 200, a notification including information (at least one of the network identifier, the frequency information, or the cell identifier) related to the NPN that the UE 100 requests to access. Specifically, when the frequencies are different between the public PLMN and the NPN, the inter frequency measurement needs to be configured from the gNB 200 to the UE 100 in order to perform quality measurement for the frequency of the NPN. Thus, the UE 100 notifies the gNB 200 of the request of the access to the NPN, in order for the gNB 200 to configure the inter frequency measurement. The UE 100 performs the inter frequency measurement and transmits a measurement report including a measurement result to the gNB 200. The gNB 200 determines to perform handover of the UE 100 to the cell of the NPN, based on the measurement report.

In Step S24, the UE 100 receives a handover indication from the gNB 200 that has determined to perform handover and performs handover to the cell of the NPN.

In contrast, when the UE 100 is in the RRC idle state or the RRC inactive state, the processing of Step S23 is not performed, and in Step S24, the UE 100 may configure the priority of the frequency (NPN frequency) indicated by the frequency information to the highest priority, based on the frequency information included in the NPN information received from the gNB 200. In this manner, the UE 100 can perform cell reselection to the cell of the NPN.

Note that, in a case of the standalone NPN, the gNB 200 cannot perform handover of the UE 100 in the RRC connected state to the cell of the NPN. Thus, the UE 100 in the RRC connected state may request the gNB 200 to release connection, when the NPN that the UE 100 desires to access is not included in the NPN information received from the gNB 200 and the UE 100 detects the NPN through the search processing. When the connection is released in response to the request, the UE 100 that has transitioned to the RRC idle state or the RRC inactive state configures the priority of the frequency of the detected NPN to the highest priority and can thereby perform cell reselection to the cell of the NPN.

Alternatively, the UE 100 may notify the gNB 200 that the UE 100 has detected a desired NPN cell (or NPN frequency), and the gNB 200 may determine execution of redirection to the NPN cell (or NPN frequency) and indicate the execution to the UE 100.

Note that the above has described operation for transitioning the UE 100 from the public PLMN to the NPN; however, conversely, the above-described operation may be applied to a case of transferring the UE 100 from the NPN to the public PLMN. In this case, because the direction of transition is the opposite, "gNB belonging to the public PLMN" in the above description is interpreted as "gNB belonging to the NPN", "gNB belonging to the NPN cell (cell belonging to the NPN)" in the above description is interpreted as "cell of the public PLMN", and "NPN information" in the above description is interpreted as "PLMN information".

Example of Cell Selection and Reselection after Search Processing

Next, an example of cell selection and reselection after search processing will be described. In an embodiment, when the UE 100 in the RRC idle state or the RRC inactive state performs cell selection or cell reselection, the UE 100 performs search processing and ranking based on a measurement result of a cell detected through the cell search. The ranking refers to assigning ranks to cells in descending order from a cell having the highest radio quality.

When at least one first cell belonging to the NPN given permission to access from the UE 100 and at least one second cell other than the at least one first cell are detected through cell search, the at least one second cell is excluded from the ranking, and ranking is performed on the at least one first cell. Here, the second cells include a cell of the public PLMN and a cell of the NPN not given permission to access.

Specifically, when the UE 100 detects at least one cell (first cell) of the NPN given permission to access, the UE 100 performs ranking in a group of the first cells. In this manner, a cell of the NPN given permission to access and which is a cell having satisfactory radio quality, can be selected, and cell reselection (or cell selection) can be performed.

The UE 100 may assign the lowest rank to a cell of the NPN not given permission to access or may exclude the cell from a ranking target.

Figure 10:
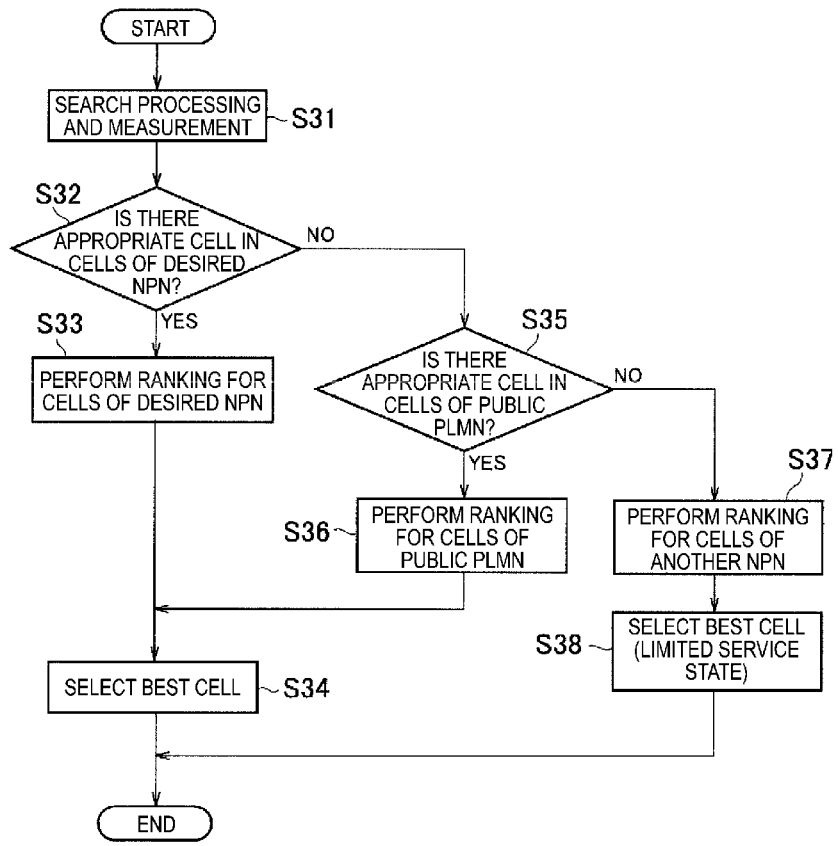
FIG. 10 is a diagram illustrating an operation example of cell selection and reselection after search processing according to an embodiment.

FIG. 10 is a diagram illustrating an operation example of cell selection and reselection after search processing according to an embodiment.

As illustrated in FIG. 10, in Step S31, the UE 100 performs search processing and measurement.

In Step S32, the UE 100 determines whether or not there is a cell of the NPN having the network identifier stored in the SIM 150, specifically, the NPN given permission to access from the UE 100 and which is a first cell satisfying a predetermined radio quality criterion, based on results of Step S31.

When there is a first cell satisfying the predetermined radio quality criterion (Step S32: YES), in Step S33, if there are a plurality of first cells satisfying the predetermined radio quality criterion, the UE 100 performs ranking, based on radio quality of each of the first cells.

In Step S34, the UE 100 selects a first cell (best cell) having the most satisfactory radio quality out of the plurality of first cells satisfying the predetermined radio quality criterion, based on results of Step S33. Note that, when there is only one first cell satisfying the predetermined radio quality criterion, the processing may proceed to Step S34 while omitting Step S33, to select the first cell.

In contrast, when there are no first cells (Step S32: NO), in Step S35, the UE 100 determines whether or not there is a public PLMN cell satisfying the predetermined radio quality criterion out of the second cells other than the first cells.

When there is a public PLMN cell satisfying the predetermined radio quality criterion (Step S35: YES), in Step S36, if there are a plurality of public PLMN cells satisfying the predetermined radio quality criterion, the UE 100 performs ranking, based on radio quality of each of the public PLMN cells.

Then, in Step S34, the UE 100 selects a public PLMN cell (best cell) having the most satisfactory radio quality out of the plurality of public PLMN cells satisfying the predetermined radio quality criterion, based on results of Step S36. Note that, when there is only one public PLMN cell satisfying the predetermined radio quality criterion, the processing proceeds to Step S34 without proceeding to Step S36, and the public PLMN cell may be selected.

In contrast, when there are no public PLMN cells satisfying the predetermined radio quality criterion (Step S35: NO), in Step S37, the UE 100 performs ranking for NPN cells not given permission to access and which are NPN cells satisfying the predetermined radio quality criterion. Note that when there are no NPN cells not given permission to access and which are NPN cells satisfying the predetermined radio quality criterion, the UE 100 may enter an out-of-service state (or a limited access state in which only emergency calls are supported, for example).

In Step S38, the UE 100 selects an NPN cell (best cell) having the most satisfactory radio quality out of the NPN cells not given permission to access and which are the NPN cells satisfying the predetermined radio quality criterion, based on results of Step S37. Note that, when there is only one NPN cell satisfying the predetermined radio quality criterion, the processing may proceed to Step S38 while omitting Step S37, to select the NPN cell. Note that the NPN cell selected in Step S38 is a cell to which the UE 100 is unable to access, and thus services provided for the UE 100 are limited.

Other Embodiments

A program causing a computer to execute each of the processes performed by the UE 100 or the gNB 200 may be provided. The program may be recorded on a computer readable medium. The program can be installed in a computer by using the computer readable medium. Here, the computer readable medium on which the program is recorded may be a non-transitory recording medium. Although the non-transitory recording medium is not limited to a particular one, a recording medium, for example, a CD-ROM, a DVD-ROM, or the like may be adopted.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the gist.

The invention claimed is:

1. A communication control method comprising:
broadcasting, by a base station configured to manage a cell belonging to a public cellular network, a cell identifier of a cell belonging to a non-public cellular network, and frequency information indicating frequency of the non-public cellular network, and
performing, by user equipment, a search process for the cell belonging to the non-public cellular network on the frequency indicated by the frequency information which is broadcast by the base station, wherein
the performing the search process for the non-public cellular network includes determining whether a second identifier includes a first identifier,
the first identifier is broadcasted by the cell belonging to a public cellular network and is an identifier of a group including users that can access the non-public cellular network,
the second identifier is included in a subscription information of the user equipment, and
the search process includes a step in which the user equipment obtains the second identifier included in the subscription information of the user equipment.

2. A user equipment comprising:
a controller configured to:
receive, from a base station configured to manage a cell belonging to a public cellular network, a cell identifier of a cell belonging to a non-public cellular network, and frequency information indicating frequency of the non-public cellular network, a first identifier, the cell identifier and the frequency information broadcast by the base station to user equipment;
perform, a search process for the cell belonging to the non-public cellular network on the frequency indicated by the frequency information which is broadcast by the base station; and
when performing the search process for the non-public cellular network, determine whether a second identifier includes a first identifier, wherein
the first identifier is broadcasted by the cell belonging to a public cellular network and is an identifier of a group including users that can access the non-public cellular network,
the second identifier is included in a subscription information of the user equipment, and
the search process includes a step in which the user equipment obtains the second identifier included in the subscription information of the user equipment.

3. A chipset for controlling a user equipment, the chipset comprising:
a processor and a memory coupled to the processor, the processor configured to execute processes of:
receiving, from a base station configured to manage a cell belonging to a public cellular network, a cell identifier of a cell belonging to a non-public cellular network, and frequency information indicating frequency of the non-public cellular network, a first identifier, the cell identifier and the frequency information broadcast by the base station to user equipment, and
performing, a search process for the cell belonging to the non-public cellular network on the frequency indicated by the frequency information which is broadcast by the base station, wherein
the performing the search process for the non-public cellular network includes determining whether a second identifier includes a first identifier,
the first identifier is broadcasted by the cell belonging to a public cellular network and is an identifier of a group including users that can access the non-public cellular network,
the second identifier is included in a subscription information of the user equipment, and
the search process includes a step in which the user equipment obtains the second identifier included in the subscription information of the user equipment.

4. A non-transitory computer-readable medium comprising, stored thereupon, computer program instructions for execution by a user equipment, the computer program instructions being configured to cause the user equipment to execute processing of:
receiving, from a base station configured to manage a cell belonging to a public cellular network, a cell identifier of a cell belonging to a non-public cellular network, and frequency information indicating frequency of the non-public cellular network, a first identifier, the cell identifier and the frequency information broadcast by the base station to user equipment; and performing, a search process for the cell belonging to the non-public cellular network on the frequency indicated by the frequency information which is broadcast by the base station, wherein the performing the search process for the non-public cellular network includes determining whether a second identifier includes a first identifier, the first identifier is broadcasted by the cell belonging to a public cellular network and is an identifier of a group including users that can access the non-public cellular network, the second identifier is included in a subscription information of the user equipment, and the search process includes a step in which the user equipment obtains the second identifier included in the subscription information of the user equipment.

5. A system comprising:

a base station configured to manage a cell belonging to a public cellular network; and a user equipment, wherein the base station is configured to broadcast a cell identifier of a cell belonging to a non-public cellular network, and frequency information indicating frequency of the non-public cellular network, and the user equipment is configured to:
  receive, from the base station, a first identifier, the cell identifier and the frequency information;
  perform, a search process for the cell belonging to the non-public cellular network on the frequency indicated by the frequency information which is broadcast by the base station; and when performing the search process for the non-public cellular network, determine whether a second identifier includes the first identifier, wherein the first identifier is broadcasted by the cell belonging to a public cellular network and is an identifier of a group including users that can access the non-public cellular network, the second identifier is included in a subscription information of the user equipment, and the search process includes a step in which the user equipment obtains the second identifier included in the subscription information of the user equipment.

\* \* \* \* \*